United States Patent [19]

Schiel et al.

[11] Patent Number: 4,691,420
[45] Date of Patent: Sep. 8, 1987

[54] STONE PRESSURE ROLL FOR A WEB OF FIBERS

[75] Inventors: Christian Schiel, Heidenheim; Herbert Kotitschke, Lenningen, both of Fed. Rep. of Germany

[73] Assignee: J.M. Voith GmbH, Fed. Rep. of Germany

[21] Appl. No.: 846,969

[22] Filed: Apr. 1, 1986

[30] Foreign Application Priority Data

Aug. 9, 1985 [DE] Fed. Rep. of Germany ....... 3528588

[51] Int. Cl.⁴ ...................... B21B 13/02; B21B 31/08
[52] U.S. Cl. .................................. 29/116 R; 29/113 R
[58] Field of Search ................. 29/132, 116 R, 113 R, 29/113 AD, 116 AD, 117, 110, DIG. 25; 241/293, 294, 295

[56] References Cited

U.S. PATENT DOCUMENTS

| | | | |
|---|---|---|---|
| 1,413,436 | 4/1922 | Vedder | 29/117 |
| 1,430,418 | 8/1922 | Vedder | 29/117 |
| 2,164,625 | 7/1939 | Prosser et al. | 29/113 R |
| 2,908,964 | 10/1959 | Appenzeller | 29/113 AD |
| 3,737,962 | 6/1973 | Hill | 29/123 |
| 4,062,096 | 12/1977 | Eibe | 29/113 AD |
| 4,272,873 | 6/1981 | Dietrich | 29/132 |
| 4,440,077 | 4/1984 | Schiel et al. | 100/162 |
| 4,506,421 | 3/1985 | Appenzeller et al. | 29/113 AD |

Primary Examiner—Mark Rosenbaum
Assistant Examiner—Irene Graves Golabi
Attorney, Agent, or Firm—Ostrolenk, Faber Gerb & Soffen

[57] ABSTRACT

A stone roll for paper machines having a rotatable tubular roll shell of stone. A bearing flange is disposed at either end of the stone roll. A plurality of paraxially arranged stressing rods are disposed in bores in the roll and extend between the bearing flanges. A stationary beam extends through the bore of the roll. A layer of metal is disposed at or defined on the inner surface of the tubular roll shell. Seals extend from the sides of the beam into contact with the metal layer. A hydraulic pressure chamber is defined between the stationary beam and the inner surface of the metal layer and around the beam between the seals for enabling force exerted on the exterior of the roll to be transmitted to the stationary beam.

21 Claims, 2 Drawing Figures

STONE PRESSURE ROLL FOR A WEB OF FIBERS

BACKGROUND OF THE INVENTION

The present invention relates to a pressure roll for a web of fibers, such as a paper web, and more particularly to a roll of stone or a like material, which uses hydraulic pressure to transmit a pressing force to a stationary beam.

An example of a pressure roll for a web of fibers may be found in U.S. Pat. No. 4,414,890. This roll utilizes a predominantly metallic roll shell, whose bearing structure is made from a metal pipe. The metal roll shell can come into direct contact with the web of fibers. In some applications, however, a blanket, for instance of rubber, covers the metal roll shell. Although rolls of this type have proven their worth, they are not suitable for the dewatering press in all paper machines. For example, in paper manufacture using wood pulp as a raw material, the surface of the roll which is contacted by the wet paper web must be formed of stone, preferably a natural stone, such as granite, although an equivalent artificial stone may be used. Heretofore, this has generally only been possible by having substantially the entire body of the roll consist of stone.

A stone roll of this type is disclosed in U.S. Pat. No. 4,272,873. This roll has a body made of stone which is either in the form of a tubular roll shell or is solid. For both roll forms, disk-shaped roll axial stressing flanges are arranged on the end surfaces of the roll. A plurality of stressing rods connect the flanges to stress the stone roll body in the axial direction. This axial stress assures that upon exertion of radially directed pressure on the roll body, in cooperation with a mating roll, excessively high bending stresses which might destroy the stone roll body in the circumferential region remote from the mating roll may be avoided. One significant disadvantage of these known stone rolls however, is that despite the prestressing of the stone roll body, only relatively slight pressing force per unit of length is permissible.

SUMMARY OF THE INVENTION

Accordingly, it is an object of the present invention to create an improved stone roll, with a roll shell comprised of stone.

A further object is to provide a stone roll which permits the application of higher pressure against a mating roll than was previously possible with a stone roll.

Another object of the invention is to hydraulically transmit the pressing force from the stone roll shell to a stationary beam inside the shell.

The present invention concerns a hollow stone roll having a shell with a cylindrical inner surface which forms a travel surface for seals and wherein the inner surface is preferably concentric with the outer surface of the roll shell. The roll shell is of stone and/or stone-like material and has a bore through it. The inner surface of the bore is relatively smooth. A bearing flange is disposed at each end of the roll shell for axial stressing of the roll shell by rods which pull the bearing flanges together.

A stationary beam is disposed through the bore in the roll shell. An annular space is defined between the stationary beam and the inner surface of the roll shell. The beam has a sealing structure that extends to the inner surface of the roll shell for defining a chamber for pressurized fluid to be disposed in only a portion of the annular region which extends axially along the annular space. The sealing structure comprises two axially extending seals that define the pressurized portion of the annular region.

According to a first embodiment of the present invention, the travel surface, which is the inner surface of the roll shell, has the seals in sliding engagement with it. The inside of the roll shell must be a smooth travel surface. A smooth travel surface, on which the seals slide, may be produced by modern manufacturing equipment on the inside of the stone roll shell. However, this cannot be done at all manufacturing plants. Additionally, for certain types of stone, sliding engagement of the seals on the inside of the stone roll shell may damage the roll shell after a short period of time. Accordingly, the alternate embodiment is described.

According to one alternate embodiment, the inner travel surface of the roll shell is formed of a layer of metal. This covers or at least compensates for the roughness of the inside of the stone roll shell and avoids or at least reduces wear of the hydraulic chamber seals which are in sliding engagement with the inside of the roll shell. The metal layer may be plated on the inside of the roll shell or may be a metallic inner tube inserted into the roll shell. Any spaces between the tube and the roll shell is filled with a hardening substance, such as taught by German Patent Application No. P 35 11 038 filed in Germany on Mar. 27, 1985 and filed in the United States on Mar. 17, 1986, Ser. No. 840,405.

Since hydraulic pressure is used to transmit force from the stone roll shell to the stationary beam, substantially higher pressing forces may now be used than had been possible with previously known rolls. Therefore, the stone roll of the invention may be used in what is variously known as a long-nip press, a wide nip press or an extended nip press in which the roll cooperates not with a second mating roll but instead with a stationary concave press shoe, through a rotating press belt. Further, the use of a hydraulic pressing force transmitting device may make it possible to dispense with a means for producing axial prestressing in the stone roll shell, although safety may dictate that prestressing means should still be used. However, there are still considerable difficulties in using both a hydraulic force transmitting device and a prestressing device within the stone roll shell.

Therefore, one solution to the preceding problem provides roll shell prestressing rods disposed in bore holes passing axially through the roll shell. The bore holes are filled in with a hardening substance thereby filling any voids between the rods and the walls of their bores. This use of prestressing rods in bore holes is known and disclosed in U.S. Pat. No. 4,272,873. However, this manner of construction has the disadvantage that boreholes are difficult to drill, requiring a special and expensive drilling device. Further, this type of drilling device is not available at all manufacturing plants. Therefore, in an alternate embodiment, the stressing rods are embedded in a filler material disposed between the inner surface of the roll shell and the outer surface of a metal inner tube which is placed inside the roll shell. This design is disclosed in the aforesaid German application No. P 35 11 038, for a stone roll without a hydraulic force transmitting device. The metal inner tube of the present invention performs two functions. It forms the travel surface for the seals and it also defines the annular space between the inner surface of the stone roll shell and the inner tube. Within that inner space, the filler prevents corrosion and oscillation of the stressing rods between the metal inner tube and the inner surface of the stone roll shell. At the same time, irregularities on the inner surface of the stone roll shell and deviations from a cylindrical surface are bridged over by the inner tube.

Other objects and features of the invention are described below with reference to the drawings.

DETAILED DESCRIPTION OF THE PREFERRED EMBODIMENTS

Figure 1:
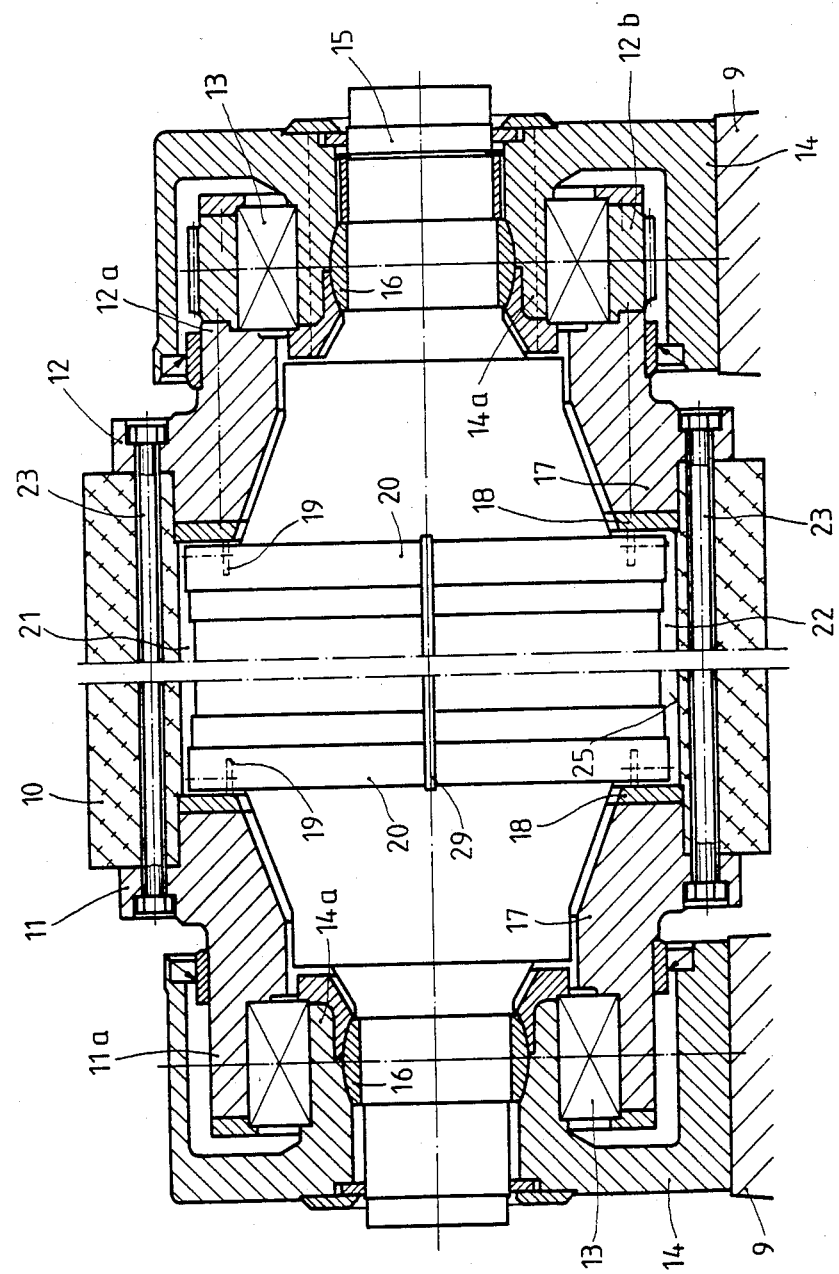
FIG. 1 shows a first embodiment of a controlled deflection stone roll shell, in longitudinal section.

FIG. 1 shows a rotatable roll shell 10 which is preferably made of granite, although other and stone materials including artificial stone materials may be utilized. Connected at the ends of the roll shell 10 are bearing flanges 11 and 12. Bearing flange 11 comprises a single or unitary part and has a hollow bearing journal 11a within which anti-friction bearing 13 is disposed. The other bearing flange 12 is comprised of two pieces including a journal pin 12a which is hollow like pin 11a, but is axially shorter, and a gear rim 12b as an extension from the pin. The gear rim 12b is screwed onto the journal pin 12a. Anti-friction bearing 13 is disposed inside the gear rim 12b. A drive gear (not shown) meshes with teeth on the periphery of the gear rim 12b in order to drive the roll shell 10. However, in the event that a drive for the roll shell is not required, the two bearing flanges 11 and 12 may be identical.

At both ends of the roll shell 10, there is a respective support pedestal 14, having a tubular collar piece 14a which extends inside the bearing journals 11a and 12a, 12b, respectively. On their outsides, collar pieces 14a each bear against one of the two anti-friction bearings 13 which are self-aligning roller bearings. A stationary beam 15, in the form of a substantially solid beam, extends through the inside of the entire roll shell 10 and is supported by spherical bushings 16 which are inside the collar pieces 14a of the support pedestals 14. The support pedestals are disposed, for instance, on a machine frame 9 or a swing arm.

An anti-friction bearing 13 is disposed at each end of the roll shell 10. The center of antifriction bearing 13 is in the same plane as the center of the spherical bushing 16. Additionally, anti-friction bearings 13 may also be arranged differently than as shown without departing from the spirit and scope of the present invention. For example, bearings 13 may rest directly on the beam 15 or be closer to the roll shell 10.

Each bearing flange 11, 12 has a collar 17 which positions the roll shell 10 and the bearing flanges 11, 12. Each collar 17 has disposed at its axially inward end a disk 18, against which a circumferential seal 19 is axially pressed. The seal 19 is held in an annular seal holder 20 on the statioary beam 15. The circumferential seals 19 limit the annular space between the roll shell 10 and the beam 15.

The annular space around the beam 15 is divided into two segments by two longitudinal seals 29 (only one is shown) spaced 180° apart, which form two semi-annular chambers 21 and 22. Chamber 21 is fed with a liquid under pressure for transmitting pressure from the roll shell 10 to the beam 15. The other chamber 22 is preferably maintained at atmospheric pressure. The longitudinal seals 29 are supported in the beam 15, are radially displaceable in the beam 15 and are pressed against the cylindrical inner surface 25 of the roll shell 10. Therefore, the longitudinal seal 29 is in sliding engagement with the inner surface 25.

In place of the semi-annular pressure chamber 21 defined by circumferential seals 19 and longitudinal seals 29, other elements may be used for the transmission of a hydraulic pressing force. For example, a known slide shoe may slide on the inner side of the roll shell and extend over its entire length. The slide shoe rests on a hydraulic pressure chamber disposed within the beam. Another known means for providing a pressing force comprises a plurality of pistonlike slide elements or shoes arranged in a row. Each element rests on a hydraulic chamber in the beam and slides on the inner side of the rotating roll shell 10.

Bearing flanges 11, 12 are clamped against the stone roll shell 10 by a plurality of stressing rods 23 which are distributed uniformly around the circumference of the roll shell 10. Each stressing rod 23 is arranged in a respective bore hole which passes through the roll shell 10. Since the diameter of each bore hole must be somewhat greater than the outside diameter of the stressing rod 23, the annular slot or space which is formed between the stressing rod and the wall of its bore hole is preferably filled with a suitable hardening substance. Therefore, oscillation of the stressing rods as well as their corrosion may be prevented.

As mentioned previously, in FIG. 1 a longitudinal sealing strip 29 is shown in sliding engagement with the inner surface 25 of roll shell 10 or on a metal layer electroplated there. The inner surface 25 is necessarily made as smooth as possible, for prohibiting the migration of pressurized fluid from chamber 21 past seals 29 which ride over the surface 25. In order to provide a completely smooth inner surface 25, metal electroplating or a plastic layer may be deposited thereon.

Figure 2:
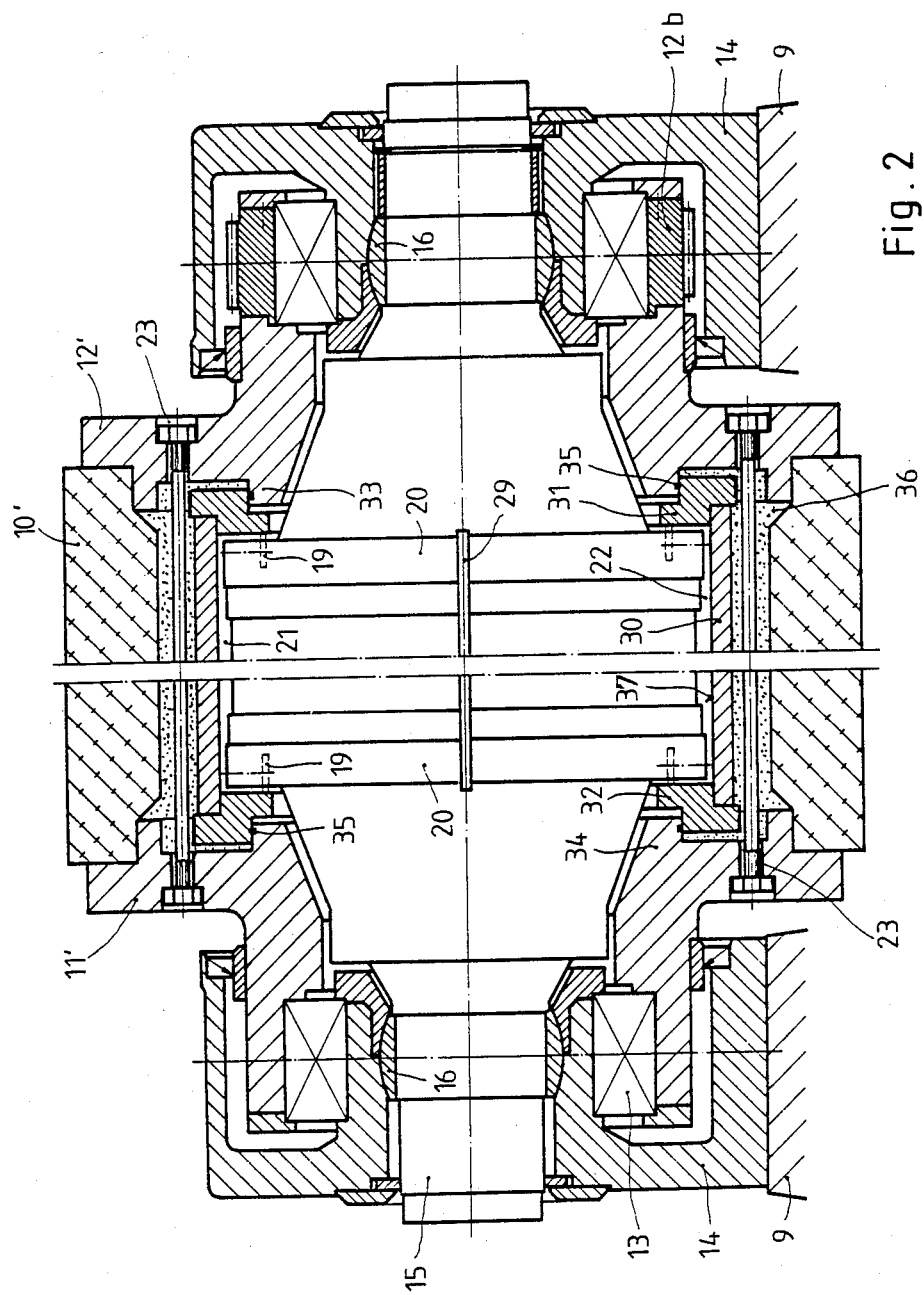
FIG. 2 is a view similar to that of FIG. 1 showing an alternate embodiment.

FIG. 2 shows an alternate embodiment of the present invention which differs in some respects from that of FIG. 1. However, components substantially identical to those previously mentioned are designated with the same reference numeral.

A stone roll shell 10' is of a slightly larger outside and inside diameter than the roll shell 10 of FIG. 1. The outside diameter of the bearing flanges 11' and 12' are correspondingly increased with respect to that of FIG. 1. Instead of passing through the stone roll shell 10, as in FIG. 1, the stressing rods 23 extend past the inner surface of the stone roll shell 10' at a slight distance inward from the shell 10'. A metallic inner tube 30 which extends concentrically through the inside of the roll shell 10', is disposed radially inward of the stressing rods 23.

At the ends of the metallic inner tube 30, respective carrying rings 31, 32 are fastened to the tube 30. Collars 34, 33 are formed on the inner sides of the bearing flanges 11', 12', respectively. These collars 34, 33 which are concentric to roll shell 10', center the carrying rings 31, 32, respectively, and thereby the metallic inner tube 30''.

A sealing ring 35 provides a seal at the two centering surfaces at the carrying rings 31, 32. Therefore, a closed annular space between the cylindrical inner surface of the stone roll shell 10' and the metallic inner tube 30 is formed. This inner space is filled with a suitable filling material 36 which is initially liquid and thereafter hardens. The filling of the space is preferably in accordance with above noted German Patent Application No. P 35 11 038. However, any suitable similar manner of filling this space is acceptable. Pre-hardened filling pieces (not shown) as described in that patent application may be arranged between adjacent stressing rods 23, thereby reducing the quantity of liquid filling material which is necessary. The cylindrical inner surface 37 of the inner tube 30 forms the travel surface for the longitudinal seals 29. Circumferential seals 19 slide on the inner ends of the two carrying rings 31, 32. Chamber 21 is hydraulically pressurized while opposite chamber 22 preferably remains unpressurized. Therefore, transmission of pressure from the stone roll shell 10' to the beam 15 is accomplished via the pressure chamber 21, as well as the hardened filling material 36 and the inner tube 30. The filling material 36 should be applied so as to fill all voids between the roll shell 10' and the inner tube 30, and should not shrink upon hardening or become brittle over a period of time.

Another embodiment, not shown, uses stressing rods 23 as in the arrangement in FIG. 1, which are in individual bore holes in the stone roll shell 10. A metallic inner tube, differing from that in FIG. 2, may be used in the stone roll shell 10. The longitudinal seals 29 slide as in FIG. 2 along the inner surface of the metal tube. The tube is adhered to the shell. This may be done through the use of cement and/or prestressing which is produced by supercooling of the metal tube upon its insertion. If the inner surface of the stone roll shell 10 has irregularities which cannot be eliminated, preventing a precisely cylindrical inner surface from being present, the inner tube is centered as in FIG. 2 and any voids between the shell and the tube are filled with a material such as that previously described which is initially liquid and thereafter hardens.

A further embodiment, also not shown, avoids the stressing rods, and instead attaches the bearing flanges directly to the inner tube by a respective plurality of threaded bolts at each end of the tube. The flanges then stress the annular roll shell.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A roll for exerting pressure on a web of fibers or the like comprising:
   a rotatable hollow roll shell comprised of stone material, said hollow roll shell having an inner surface on the inside thereof and a roll shell outer surface on the exterior of said roll shell;
   a stationary beam disposed in said hollow roll shell, said beam having two ends;
   a beam support means disposed at each end of said stationary beam, said beam being sized such that an annular space is defined between said stationary beam and said inner surface;
   sealing means supported on said beam and extending into contact with said inner surface of said roll shell and being shaped for defining a portion of said annular space, said inner surface of said roll shell presenting a smooth sealing surface for contacting said sealing means; and
   means for pressurizing said portion of said annular space.

2. A roll according to claim 1, wherein a layer of plastic is disposed on said inner surface in said hollow roll shell.

3. A roll according to claim 1, wherein said stone material is stone.

4. A roll according to claim 1, wherein said stone material is comprised of granite.

5. A roll according to claim 1, wherein said stone material is artificial.

6. A roll according to claim 1, wherein a layer of metal is disposed on said inner surface in said hollow roll shell for presenting said smooth sealing surface.

7. A roll according to claim 6, wherein said metal layer is electroplated onto said inner surface in said hollow roll shell.

8. A roll according to claim 6, wherein a space is defined between said layer of metal and said roll shell inner surface, said space being filled with a material which solidifies and hardens.

9. A roll according to claim 8, wherein said solid material is semi-liquid at room temperature prior to said hardening and does not shrink thereafter.

10. A roll according to claim 1, further comprising a metallic inner tube disposed in said roll shell, said metallic inner tube having an inner surface on the inside thereof, and an outer surface on the outside thereof, said metallic tube inner surface comprising said inner surface inside said roll shell for presenting said smooth sealing surface.

11. A roll according to claim 10, wherein a space is defined between said metallic inner tube outer surface and said roll shell inner surface, said space being filled with a material which solidifies and hardens.

12. A roll according to claim 11, further comprising a bearing flange disposed at each end of said roll shell for supporting said roll shell for rotation; and a plurality of threaded bolts extending between each said bearing flange and said inner tube for producing axial stressing forces in said roll shell through its connection to said metallic inner tube.

13. A roll according to claim 10, wherein said space between said outer surface of said metal tube and said inner surface of said roll shell is filled with a solid material.

14. A roll according to claim 13, wherein said solid material is semi-liquid at room temperature, and then hardens and does not shrink thereafter.

15. A roll according to claim 1, further comprising a bearing flange disposed at each end of said roll shell for supporting said roll shell for rotation.

16. A roll according to claim 15, further comprising a plurality of paraxial stressing rods extending between said bearing flanges for producing axial prestressing forces in said roll shell.

17. A roll according to claim 16, further comprising a plurality of circumferentially disposed bore holes extended through said roll shell, said paraxial stressing rods being disposed in said bore holes.

18. A roll according to claim 17, wherein further comprising a hardened filling material in which said paraxial stressing rods are disposed, said filling material being adjacent said inner surface of said roll shell.

19. A roll according to claim 15, further comprising a plurality of paraxial stressing rods extending between said bearing flanges for producing axial prestressing forces in said roll shell.

20. A roll according to claim 19, further comprising a plurality of circumferentially disposed bore holes extended through said roll shell, said paraxial stressing rods being disposed in said bore holes.

21. A roll according to claim 20, further comprising a hardened filling material in which said paraxial stressing rods are disposed, said filling material being adjacent said inner surface of said roll shell.

* * * * *